United States Patent
Yanagida

(10) Patent No.: US 10,296,455 B2
(45) Date of Patent: May 21, 2019

(54) MEMORY SYSTEM AND CONTROL METHOD OF NONVOLATILE MEMORY

(71) Applicant: Toshiba Memory Corporation, Tokyo (JP)

(72) Inventor: Kyosei Yanagida, Yokohama Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 68 days.

(21) Appl. No.: 15/694,832

(22) Filed: Sep. 3, 2017

(65) Prior Publication Data

US 2018/0276118 A1  Sep. 27, 2018

(30) Foreign Application Priority Data

Mar. 23, 2017  (JP) .................. 2017-058268

(51) Int. Cl.
*G06F 12/00* (2006.01)
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0641* (2013.01); *G06F 3/0659* (2013.01); *G06F 3/0688* (2013.01); *G06F 12/0246* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,171,254 B2 | 5/2012 | Takamiya et al. | |
| 8,930,814 B2 | 1/2015 | Nasuo et al. | |
| 2013/0275650 A1 | 10/2013 | Hida et al. | |
| 2016/0179386 A1* | 6/2016 | Zhang | G06F 3/0679 |
| | | | 711/103 |
| 2016/0313943 A1* | 10/2016 | Hashimoto | G06F 3/061 |
| 2017/0242788 A1* | 8/2017 | Ahmed | G06F 12/0246 |
| 2017/0262178 A1* | 9/2017 | Hashimoto | G06F 3/0604 |

(Continued)

FOREIGN PATENT DOCUMENTS

| | | |
|---|---|---|
| JP | 2011-159044 A | 8/2011 |
| JP | 4738536 B1 | 8/2011 |

(Continued)

*Primary Examiner* — John A Lane
(74) *Attorney, Agent, or Firm* — Kim & Stewart LLP

(57) ABSTRACT

A memory system includes a nonvolatile memory that includes a plurality of blocks and a memory controller with a control circuit. The control circuit executes a first garbage collection for a first stream, which includes reading valid first data stored in a first block associated with the first stream and valid second data stored in a second block associated with the first stream and writing the read first data and the read second data into a third block associated with the first stream, and a second garbage collection for a second stream, which includes reading valid third data stored in a fourth block associated with the second stream and valid fourth data stored in a fifth block associated with the second stream and writing the read third data and the read fourth data into a sixth block associated with the second stream.

20 Claims, 11 Drawing Sheets

(56) References Cited

U.S. PATENT DOCUMENTS

| | | | |
|---|---|---|---|
| 2018/0059988 A1* | 3/2018 | Shivanand | G06F 3/061 |
| 2018/0217926 A1* | 8/2018 | Ogawa | G06F 12/00 |
| 2018/0307596 A1* | 10/2018 | Pandurangan | G06F 12/0246 |
| 2018/0307598 A1* | 10/2018 | Fischer | G06F 12/0253 |

FOREIGN PATENT DOCUMENTS

| | | |
|---|---|---|
| JP | 2012141946 A | 7/2012 |
| JP | 5579135 B2 | 8/2014 |

\* cited by examiner

FIG. 3

| STREAM ID | WRITING DESTINATION BLOCK ID | ACTIVE BLOCK ID |
|---|---|---|
| 1 | #B5, #B6 | #B1, #B300, #B301, #B302 |
| 2 | #B7 | #B2, #B400, #B401 |
| ⋮ | ⋮ | ⋮ |
| INVALID VALUE | #B201 | #B600 |

MEMORY SYSTEM AND CONTROL METHOD OF NONVOLATILE MEMORY

CROSS-REFERENCE TO RELATED APPLICATION

This application is based upon and claims the benefit of priority from Japanese Patent Application No. 2017-058268, filed Mar. 23, 2017, the entire contents of which are incorporated herein by reference.

FIELD

Embodiments described herein relate generally to a memory system including a nonvolatile memory and a control method of the nonvolatile memory.

BACKGROUND

In multi-stream control, a host performs multi-stream management and may allocate same stream ID to pieces of data having similar expected lifetimes. Pieces of data having the same stream ID may be highly likely to be invalidated together. However, multi-stream management performed by the host may not be suitable in some applications or to some users.

DESCRIPTION OF THE DRAWINGS

FIG. 3 is a diagram illustrating a data structure of stream management information.

DETAILED DESCRIPTION

Embodiments provide a memory system that suitably manages data to be subjected to multi-stream management, and a control method of a nonvolatile memory in such a memory system.

In general, according to one embodiment, a memory system includes a nonvolatile memory including a plurality of blocks and a memory controller including a control circuit. The control circuit executes a first garbage collection for a first stream and a second garbage collection for a second stream. The first garbage collection includes reading valid first data stored in a first block associated with the first stream and valid second data stored in a second block associated with the first stream from the nonvolatile memory and writing the read first data and the read second data into one or more third blocks of the nonvolatile memory that are associated with the first stream, and the second garbage collection includes reading valid third data stored in a fourth block associated with the second stream and valid fourth data stored in a fifth block associated with the second stream from the nonvolatile memory and writing the read third data and the read fourth data into one or more sixth blocks of the nonvolatile memory that are associated with the second stream.

In the following, a memory system and a control method of a nonvolatile memory according to embodiments will be described in detail with reference to the accompanying drawings. The present invention is not limited to the embodiments.

First Embodiment

Figure 1:
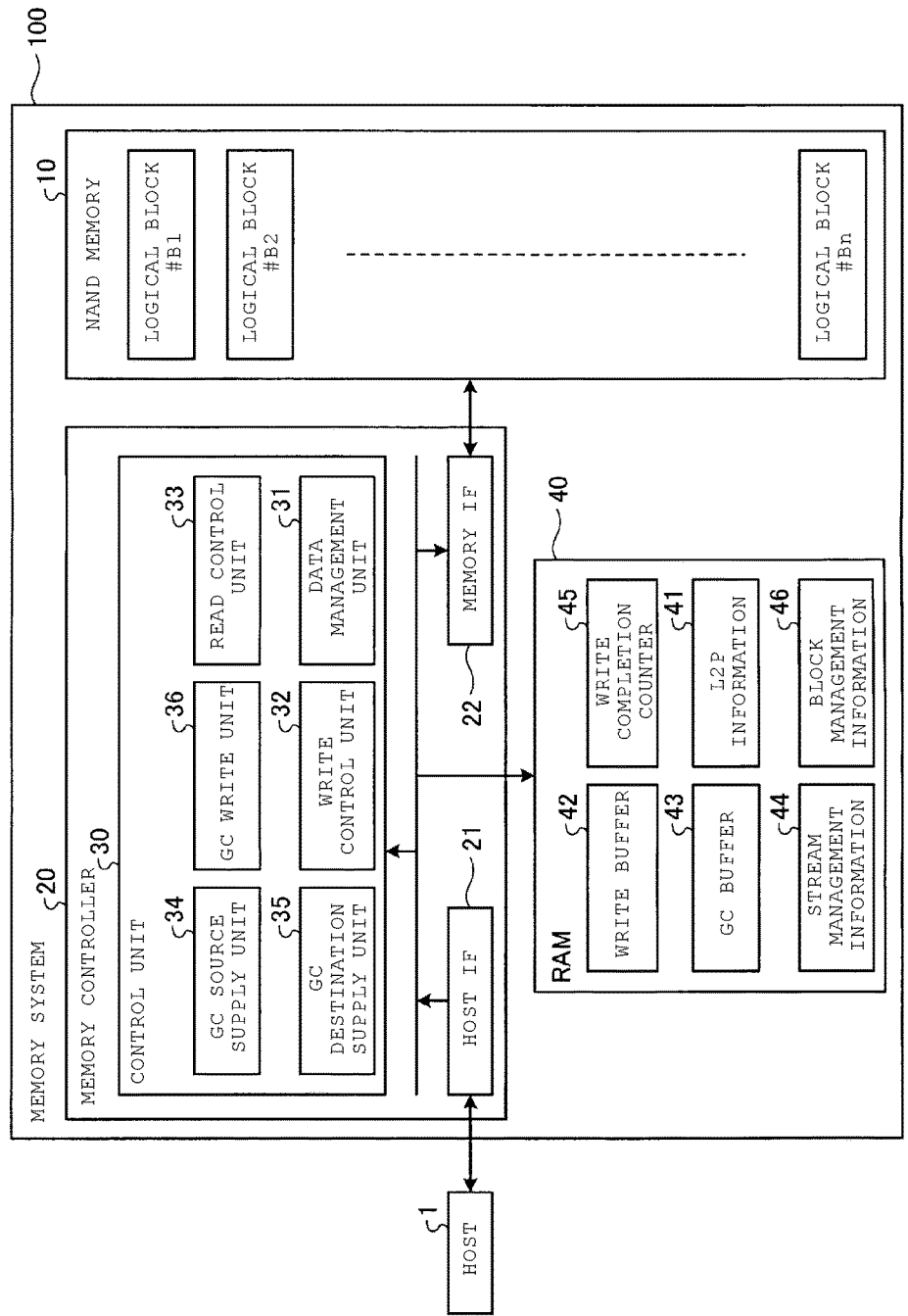
FIG. 1 is a block diagram illustrating an example of a configuration of a memory system.

FIG. 1 is a block diagram illustrating an example of a configuration of a memory system 100 of a first embodiment. The memory system 100 is connected with a host device (in the following, referred to as a host) 1 through a communication line and functions as an external storage device of the host 1. The host 1, for example, may be an information processing device such as a personal computer, a mobile phone, and an image capturing device, may be a portable terminal such as a tablet computer or a smartphone, may be game equipment, or may be a vehicle-mounted terminal such as a car navigation system.

The memory system 100 includes a NAND flash memory (in the following, referred to as a NAND memory) 10 as a nonvolatile memory, a memory controller 20, and a random access memory (RAM) 40. The nonvolatile memory is not limited to the NAND flash memory and may include a three-dimensional flash memory, a resistance random access memory (ReRAM), a ferroelectric random access memory (FeRAM), a cross-point memory, a phase change memory (PCM), a magnetoresistive random access memory (MRAM), or the like.

The NAND memory 10 includes a plurality of memory chips. Each memory chip includes a plurality of physical blocks. The physical block is the smallest physical unit for data erasure. Each physical block includes a plurality of memory cells. Each memory cell is able to store multi-valued data. Each physical block includes a plurality of pages. Data read and data write are executed in units of pages. Writing of data into a page can typically be made only once per one erase cycle. The NAND memory 10 includes a plurality of logical blocks #B1, #B2, . . . , #Bn. The logical block is configured with physical blocks collected from a plurality of memory chips. The logical block is formed by combining the plurality of physical blocks so as to allow parallel operations to be performed across multiple chips. The plurality of physical blocks constituting the logical block are simultaneously erased and is used as a logical block for data write. In a case of a memory chip capable of allowing parallel plane operations, the logical blocks maybe configured so that parallel chip operations and parallel plane operations are allowed.

User data transmitted from the host 1, management information of the memory system 100, firmware, and the like are stored in the NAND memory 10. The firmware is executed in a CPU (not illustrated) to carry out the functions of a control circuit 30 of the memory controller 20. The firmware may be stored in a ROM (not illustrated). The management information includes logical and physical conversion information (L2P information), or the like.

The RAM 40 is a volatile semiconductor memory to which access can be made at a higher speed than the NAND memory 10. A static random access memory (SRAM) or a dynamic random access memory (DRAM) is used as the RAM 40. The RAM 40 includes a write buffer 42, a garbage collection buffer (in the following, referred to as a GC buffer) 43, and a write completion counter 45. The RAM 40 stores L2P information 41, stream management information 44, and block management information 46. Data received from the host 1 is temporarily buffered in the write buffer 42 before being written into the NAND memory 10. The GC buffer 43 buffers valid data read from a logical block of a garbage collection source of the NAND memory 10 for a period during which valid data is written into a logical block of a garbage collection destination. The write completion counter 45 maintains a count value of the number of logical blocks for which writing is completed by garbage collection for each stream ID.

L2P information 41 includes mapping information associating a logical address designated by the host 1 with a physical address of the NAND memory 10. For example, logical block addresses (LBAs) are used as the logical address. The physical address indicates a storage location in the NAND memory 10 in which data is stored.

Block management information 46, which is one of pieces of management information, manages the logical block included in the NAND memory 10. Pieces of block management information include:

the number of erase times (erase count) in units of logical blocks, information for distinguishing whether the logical block is an active block or a free block, the number of pieces of valid data in units of logical blocks or a valid data ratio, block address of a bad block, and correspondence relationship between logical blocks and stream IDs.

The logical block cyclically transitions in a sequence of an active block, a free block, an erased block, a writing destination block, and the active block. The active block is a block in which one or more pieces of valid data are recorded and which is filled with valid data or invalid data. Alternately, the active block is a block in which one or more pieces of valid data are recorded and for which one or more writing is not performed. In the free block, valid data is not recorded. The free block is able to be reused as an erased block after data is erased. Valid data is data correlated with a logical address by L2P information 41 and invalid data is data not correlated with the logical address by L2P information 41. The erased block transitions to the writing destination block. Writing into the writing destination block is started. Data can be written into the writing destination block. Data cannot be written into the active block. A bad block does not operate normally due to various causes (e.g., defects) and is disabled.

The stream management information 44 includes a correspondence relationship between a stream ID and a single writing destination block or a plurality of writing destination blocks in which data added with the stream ID is written and/or the active block.

The memory controller 20 includes a host interface (host IF) 21, a memory interface (memory IF) 22, and the control circuit 30. In the first embodiment, the RAM 40 is installed outside the memory controller 20. Alternatively, the RAM 40 may be installed inside the memory controller 20.

The host IF 21 receives a read request and a write request from the host 1. The write request includes a write command, a write address, and write data. The read request includes a read command and a read address. The host IF 21 transfers the received write request or read request to the control circuit 30. The host IF 21 transmits user data read from the NAND memory 10, a response of the control circuit 30, or the like to the host 1.

The control circuit 30 controls the components of the memory system 100. The control circuit 30 includes a data management unit 31, a write control unit 32, a read control unit 33, a garbage collection source supply unit (in the following, referred to as a GC source supply unit) 34, a garbage collection destination supply unit (in the following, referred to as a GC destination supply unit) 35, and a garbage collection write unit (GC write unit) 36. In one embodiment, these units of the control circuit 30 are realized by a single or a plurality of processors that execute firmware loaded onto the RAM 40 and a peripheral circuit.

The data management unit 31 executes management of the logical blocks included in the NAND memory 10 using block management information 46. The data management unit 31 manages user data using L2P information 41. In a case where the write request is received from the host 1, the data management unit 31 converts the write address as the logical address into a physical address using block management information 46 and determines a recording position in the NAND memory 10 to which write data is to be written. The data management unit 31 updates L2P information 41 with the logical address and the determined physical address. In a case where the read request is received from the host 1, the data management unit 31 converts the read address as the logical address into a physical address using L2P information 41 and determines a recording position in the NAND memory 10 from which data is to be read.

The write control unit 32 executes processing for writing data into the NAND memory 10 according to the write request received from the host 1. In a case where the write request is received from the host 1, the write control unit 32 buffers data transferred from the host 1 in the write buffer 42. In a case where an amount of data buffered in the write buffer 42 exceeds a predetermined amount, the write control unit 32 transfers data from the write buffer 42 to the memory IF 22. The write control unit 32 acquires the physical address on the NAND memory 10 to which data is to be written from the data management unit 31 and outputs the acquired physical address to the memory IF 22.

The read control unit 33 performs control for reading data from the NAND memory 10 according to the read request received from the host 1. The read control unit 33 acquires the physical address on the NAND memory 10 corresponding to the logical address of read data from the data management unit 31 and outputs the acquired physical address to the memory IF 22.

The GC source supply unit 34, the GC destination supply unit 35, and the GC write unit 36 execute garbage collection. In a case where a unit of data erase (e.g., block) is different from a unit of data write in the memory system 100, when rewriting is performed for data stored in a block of the NAND memory 10, the block will be fragmented by invalid pieces of data. When the number of such fragmented blocks is increased, the number of usable blocks is reduced. For example, if the shortage of free blocks of the NAND memory 10, of which the number is smaller than a predetermined threshold value, occurs, garbage collection is executed to increase the number of free blocks. In garbage collection, pieces of valid data are collected from a single logical block or a plurality of logical blocks of a garbage collection source in which valid data and invalid data are written and are rewritten into the logical block of the garbage collection destination.

The GC source supply unit 34 selects the active block as the logical block of the garbage collection source based on stream management information 44, the valid data ratio (or amount of valid data) managed by block management information 46, and the write completion counter 45.

The GC write unit 36 reads valid data from the logical block of the GC source designated by the GC source supply unit 34 and buffers read valid data in the GC buffer 43. The GC write unit 36 writes buffered valid data into a logical block of a GC destination designated by the GC destination supply unit 35. The GC write unit 36 increments the write completion counter each time when single writing into the logical block is completed. The GC write unit 36 updates stream management information 44 so that the logical block of the GC destination corresponds to the stream ID according to writing.

The memory IF 22 outputs the physical address supplied from the write control unit 32 and a piece of write data supplied from the write buffer 42 to the NAND memory 10 to thereby write the piece of write data into the NAND memory 10. The memory IF 22 outputs the physical address supplied from the read control unit 33 to the NAND memory 10 to thereby read a piece of data from the NAND memory 10. The memory IF 22 may includes an error correcting code (ECC) circuit. The ECC circuit performs encoding processing for error correction on data transferred from the write buffer 42 and generates a parity bit. The ECC circuit outputs a code word including data and the parity bit to the NAND memory 10. The ECC circuit executes decoding processing for error correction using the code word read from the NAND memory 10 and transfers decoded data to the read control unit 33.

The memory system 100 according to the first embodiment supports a multi-stream write operation for decreasing execution frequency of the garbage collection, in addition to a normal write operation. In multi-streaming, the host 1 may associate pieces of data having expected similar lifetimes, such as piece of data included in the same file, with a stream having the same stream ID. The memory system 100 writes one or more pieces of data associated with the same stream ID into a single logical block or a plurality of logical blocks that belongs to the same group. On the other hand, pieces of data associated with different stream IDs are written into the logical blocks belonging to different groups. When the host 1 erases pieces of data, all pieces of data associated with the same stream ID data are highly likely to be invalidated together and thus, according to multi-stream control by the memory system 100 according to the first embodiment, it is possible to decrease execution frequency of garbage collection and improve performance deterioration and lifetime reduction of the memory system 100.

Figure 2:
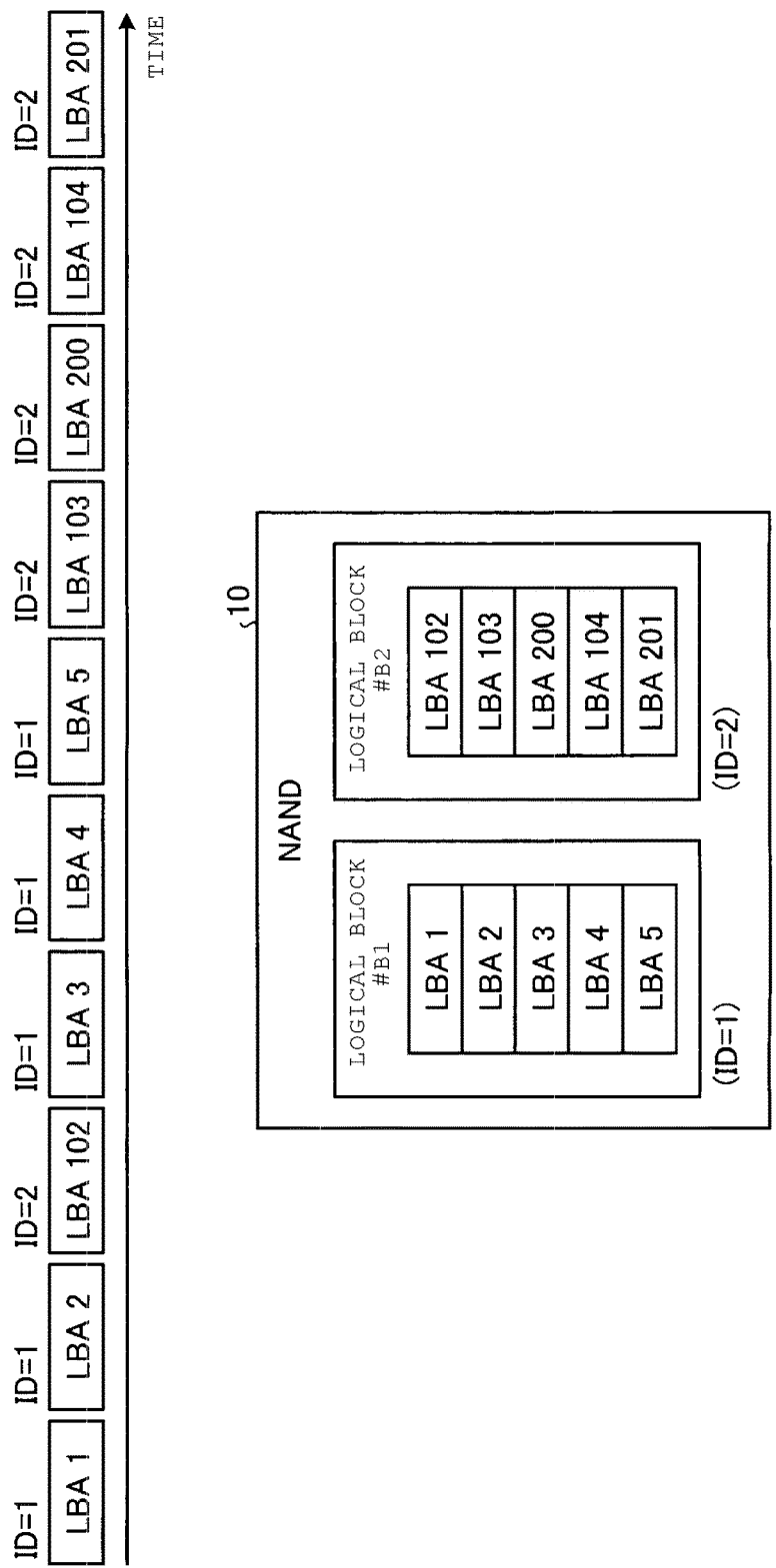
FIG. 2 is a diagram conceptually illustrating a multi-stream write operation.

FIG. 2 is a diagram conceptually illustrating a write operation by multi-streaming according to the first embodiment. Piece of data assigned a stream ID1 (e.g., pieces of data respectively designated by LBA 1, LBA 2, LBA 3, LBA 4, and LBA 5 in FIG. 2) are written into an erased logical block #B1 which is allocated for a stream having ID1. Piece of data assigned a stream ID2 (e.g., pieces of data respectively designated by LBA 102, LBA 103, LBA 200, LBA 104, and LBA 201 in FIG. 2) are written into an erased logical block #B2 which is allocated for a stream having ID2.

A policy by which the host 1 allocates the stream ID may arbitrarily determine the stream ID for each application and thus, pieces of data having different lifetimes may be allocated to the same stream or sizes of pieces of data allocated to respective stream IDs may not coincide with management unit of stream data in the memory system 100. In this case, writing of data into the memory system 100 is performed and garbage collection is also likely to occur for a logical block to be subjected to multi-stream management. In a case where garbage collection occurs for the logical block to be subjected to multi-stream management, for example, when the logical block of the garbage collection source is selected by using only the valid data ratio, pieces of data having different stream IDs may be mixed and written into the same logical block of the garbage collection destination. In this case, a write amplification factor (WAF) is increased, resulting in performance deterioration and lifetime reduction of the memory system 100.

In the first embodiment, only the logical blocks having the same stream ID are selected as the garbage collection source and the garbage collection is executed for the logical blocks. That is, in the garbage collection of the first embodiment, valid first data stored in a first block associated with a first stream and valid second data stored in a second block associated with the first stream are read from the NAND memory 10 and the read first data and second data are written into a third block of the NAND memory 10. Accordingly, in the first embodiment, an increase of the WAF by garbage collection is prevented and lifetime prolongation and performance improvement of the memory system are achieved.

FIG. 3 is a diagram illustrating a data structure of stream management information 44 managed by the data management unit 31. Stream management information 44 includes information indicating a correspondence relationship between the stream ID, the ID (e.g., logical block address) of a single writing destination block or a plurality of writing destination blocks, and the ID of a single active block or a plurality of active blocks. In FIG. 3, an example, in which writing destination blocks #B5 and #B6 and active blocks #B1, #B300, #B301, and #B302 are registered in a stream ID1 and a writing destination block #B7 and active blocks #B2, #B400, and #B401 are registered in a stream ID2, is illustrated. The stream ID having an invalid value is associated with a writing destination block #B201 and an active block #B600. In a case where a write request for multi-stream control is received from the host 1, the data management unit 31 registers association information between blocks in the stream management information 44 when selecting a new writing destination block. In a case where garbage collection is executed, the data management unit 31 registers the association information the stream management information 44 when selecting a new logical block of GC destination. When an active block transitions to a free block, the data management unit 31 disassociates the association of the stream ID with the ID of the active block in stream management information 44.

A close stream command is a command that requests for closure of an opened stream. The close stream command includes a parameter indicating a stream ID of a closed stream. When the close stream command is received from the host 1, thereafter, the data management unit 31 manages a writing destination block corresponding to the stream ID designated by the close stream command as an active block. In stream management information 44, correlation of the stream ID designated by the close stream command with the logical block corresponding to the stream ID is not changed.

The data management unit 31 transmits a response including a command completion notification to the host 1.

Figure 4:
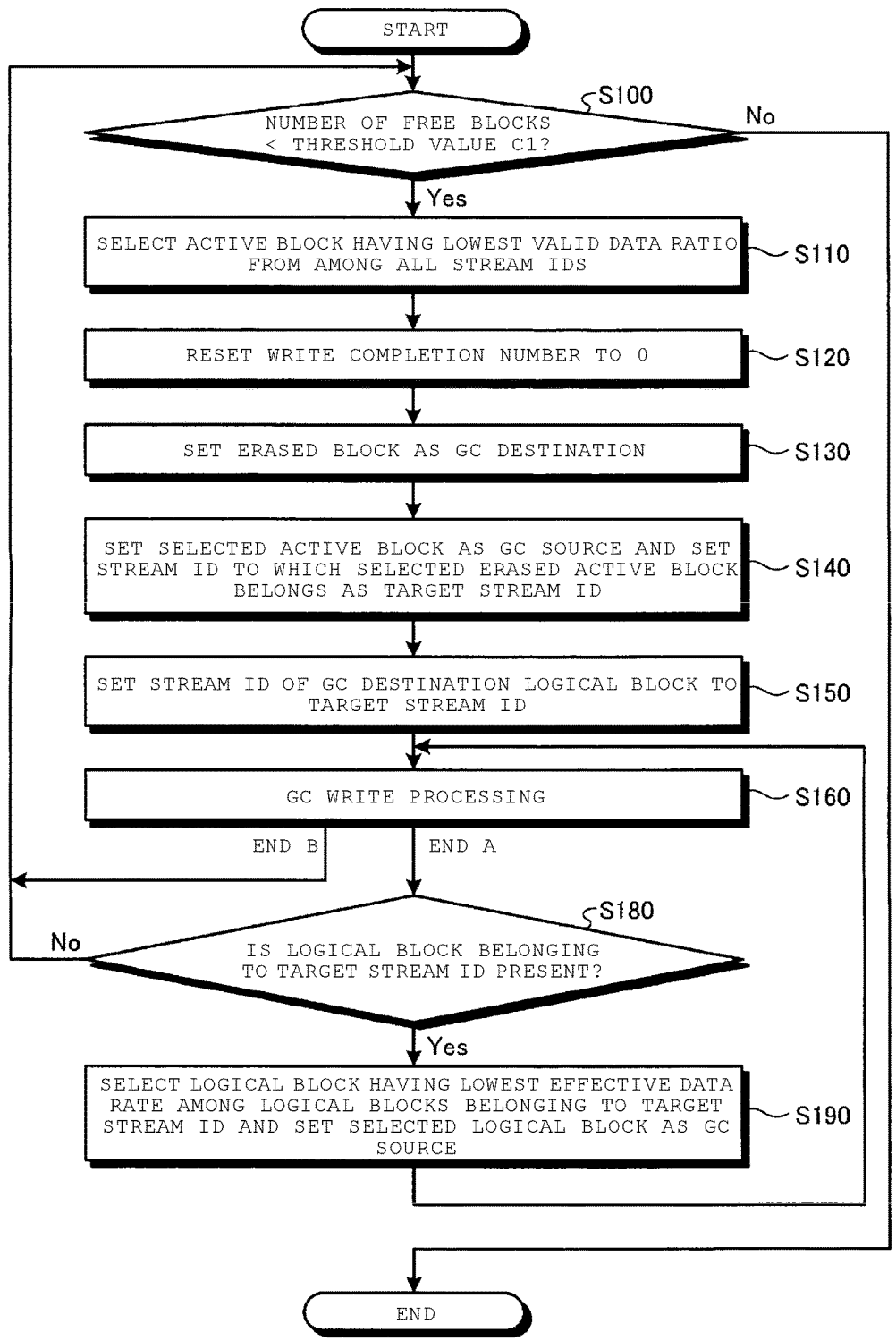
FIG. 4 is a flowchart illustrating an operation procedure of garbage collection of a first embodiment.

FIG. 4 is a flowchart illustrating an operation procedure of the control circuit 30 when garbage collection for a logical block to be subjected to multi-stream management occurs. The data management unit 31 counts the number of free blocks used with all stream IDs in multi-stream control. If the count value is less than a predetermined threshold value C1 (Yes in S100), the data management unit 31 instructs the GC source supply unit 34, the GC destination supply unit 35, and the GC write unit 36 to start garbage collection for the logical block to be subjected to multi-stream management. The data management unit 31 informs the GC write unit 36 of a target value C2 for a write completion number. The write completion number corresponds to a count value of the write completion counter 45. The target value C2 of the write completion number indicates a target value of the number of logical blocks of a GC destination for which writing is completed in one cycle of a garbage collection process.

The GC source supply unit 34 selects the active block having the lowest valid data ratio from among all active blocks to be subjected to multi-stream management based on the stream management information 44 and the block management information 46 (S110). The valid data ratio is a ratio of a size of valid data to a size of a logical block. An active block having the least amount of valid data may be selected.

The GC write unit 36 resets the count value of the write completion counter 45 to zero (S120). The GC destination supply unit 35 selects, for example, a single erased block and notifies the GC write unit 36 of a block address of the erased block, which is selected, as a garbage collection destination (S130).

The GC source supply unit 34 notifies the GC write unit 36 of the block address of the active block selected in S110 as a garbage collection source. Furthermore, the GC source supply unit 34 acquires the stream ID to which the active block selected in S110 belongs based on stream management information 44 and sets the acquired stream ID as a current stream ID to be subjected to garbage collection (S140). The current stream ID to be subjected to garbage collection is referred to as a target stream ID for short.

The GC destination supply unit 35 updates the stream management information 44 so that the stream ID of the erased block selected in S130 coincides with the target stream ID which is set in S140 (S150). Specifically, the GC destination supply unit 35 associates a block address of the erased block selected in S130 with the target stream ID which is set in S140.

Next, the GC write unit 36 starts garbage collection write processing regarding a target stream ID based on the logical block address of the GC source notified from the GC source supply unit 34 and the logical block address of the GC destination notified from the GC destination supply unit 35 (S160).

Figure 5:
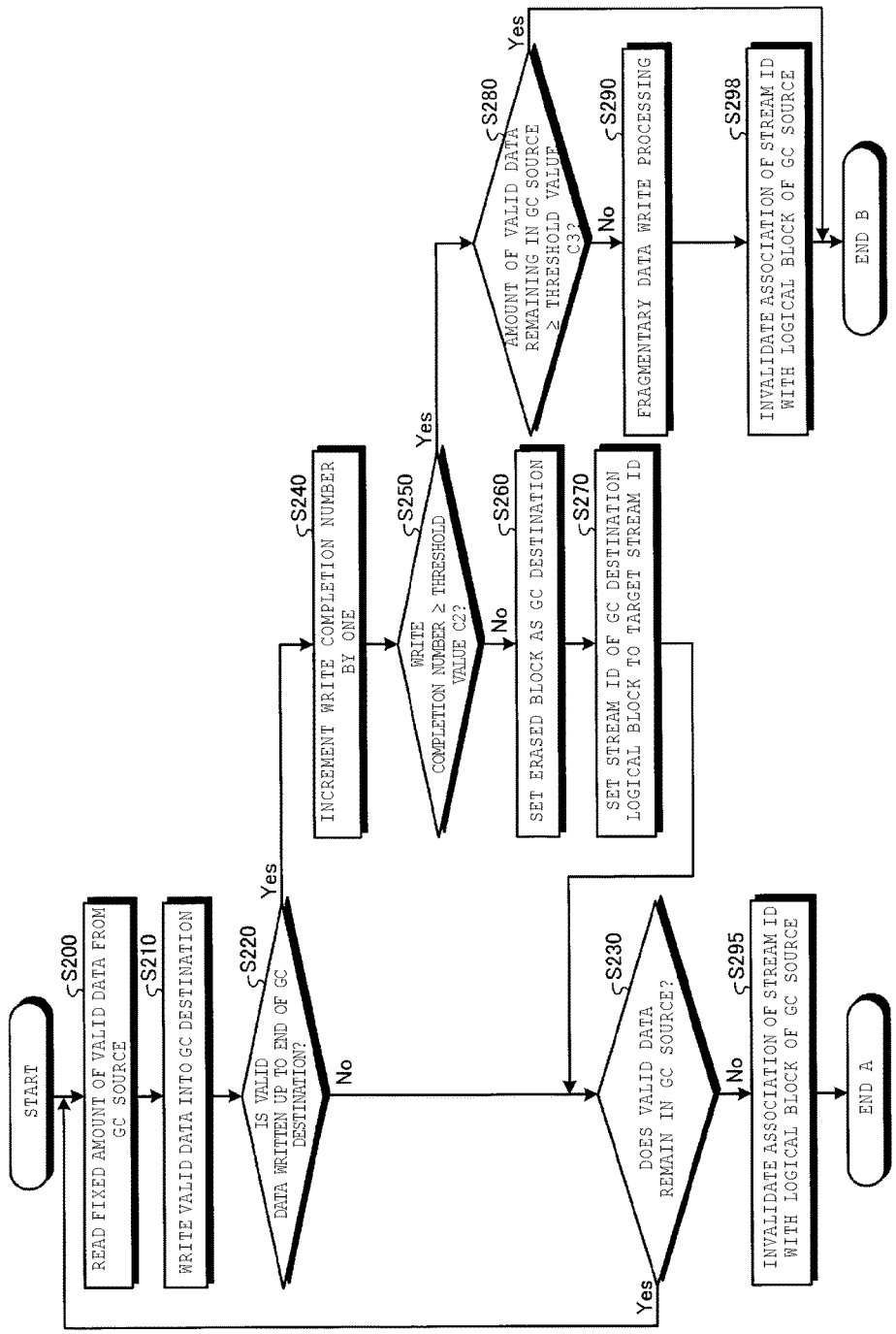
FIG. 5 is flowchart illustrating a write operation procedure performed during the garbage collection of the first embodiment.

FIG. 5 is a flowchart illustrating an example of a detailed procedure of garbage collection write processing in S160. The GC write unit 36 controls the memory IF 22 so as to read a fixed amount of valid data from the logical block of the garbage collection source of the NAND memory 10 (S200). The GC write unit 36 buffers read valid data in the GC buffer 43. The GC write unit 36 controls the memory IF 22 so as to write valid data buffered in the GC buffer 43 into the logical block of the garbage collection destination (S210). The GC write unit 36 determines whether valid data is written up to an end of the logical block of the garbage collection destination or not (S220). In a case where the determination result in S220 is No, the GC write unit 36 determines whether valid data remains in the logical block of the garbage collection source or not (S230). In a case where the determination result in S230 is Yes, the GC write unit 36 repeats processing of S200, S210, and S220 again. In a case where valid data does not remain in the logical block of the garbage collection source (No in S230), the GC write unit 36 updates the stream management information 44 so that association of the block ID of the logical block of the garbage collection source and the target stream ID is invalidated (S295). With this, the active block is released and transitions to a free block. When processing of S295 is ended, processing illustrated in FIG. 5 is completed and processing proceeds to S180 of FIG. 4.

In S220, in a case where data is written up to the end of the logical block of the garbage collection destination (Yes in S220), the GC write unit 36 increments the count value of the write completion counter 45 (S240) and requests the data management unit 31 so that the writing destination block in which data is written up to the end thereof is managed as an active block in stream management information 44. The GC write unit 36 determines whether the incremented count value reaches the target value C2 of the write completion number or not (S250). In a case where it is determined that the count value of the write completion counter 45 does not reach the target value C2 (No in S250), the GC write unit 36 requests a new logical block of a garbage collection destination to the GC destination supply unit 35. That is, a case where the determination result is S250 is No corresponds to a case where valid data is remaining in the garbage collection source (Yes in S230), data is written up to the end of the logical block of the garbage collection destination (Yes in S220), and the number of logical blocks of the GC destination for which writing is completed does not reach the target value C2 and thus, the new logical block of garbage collection destination needs to be allocated. When a request is made from the GC write unit 36, the GC destination supply unit 35 selects, for example, a single erased block and notifies the GC write unit 36 of the block address of the erased block, which is selected, as the garbage collection destination (S260). The GC destination supply unit 35 updates stream management information 44 so that the erased block selected in S260 coincides with the target stream ID which is set in S140 of FIG. 4 (S270). Thereafter, processing proceeds to S230.

In S250, in a case where the count value of the write completion counter 45 reaches the target value C2 of the write completion number (Yes in S250), the GC write unit 36 determines whether the amount of valid data remaining in the logical block of the garbage collection source is greater than or equal to a threshold value C3 or not (S280). In a case where it is determined that the amount of remaining valid data is greater than or equal to the threshold value C3 (Yes in S280), the GC write unit 36 determines that valid data remaining in the logical block of the garbage collection source is not fragmentary data and leaves valid data remaining in the logical block of the garbage collection source as it is and sets valid data as a target for next garbage collection. Thereafter, processing proceeds to S100 of FIG. 4. In a case where the amount of remaining valid data is not greater than or equal to the threshold value C3 (No in S280), the GC write unit 36 determines that valid data remaining in the logical block of the garbage collection source is fragmentary data and the GC write unit 36 executes fragmentary data write processing (S290).

Figure 6:
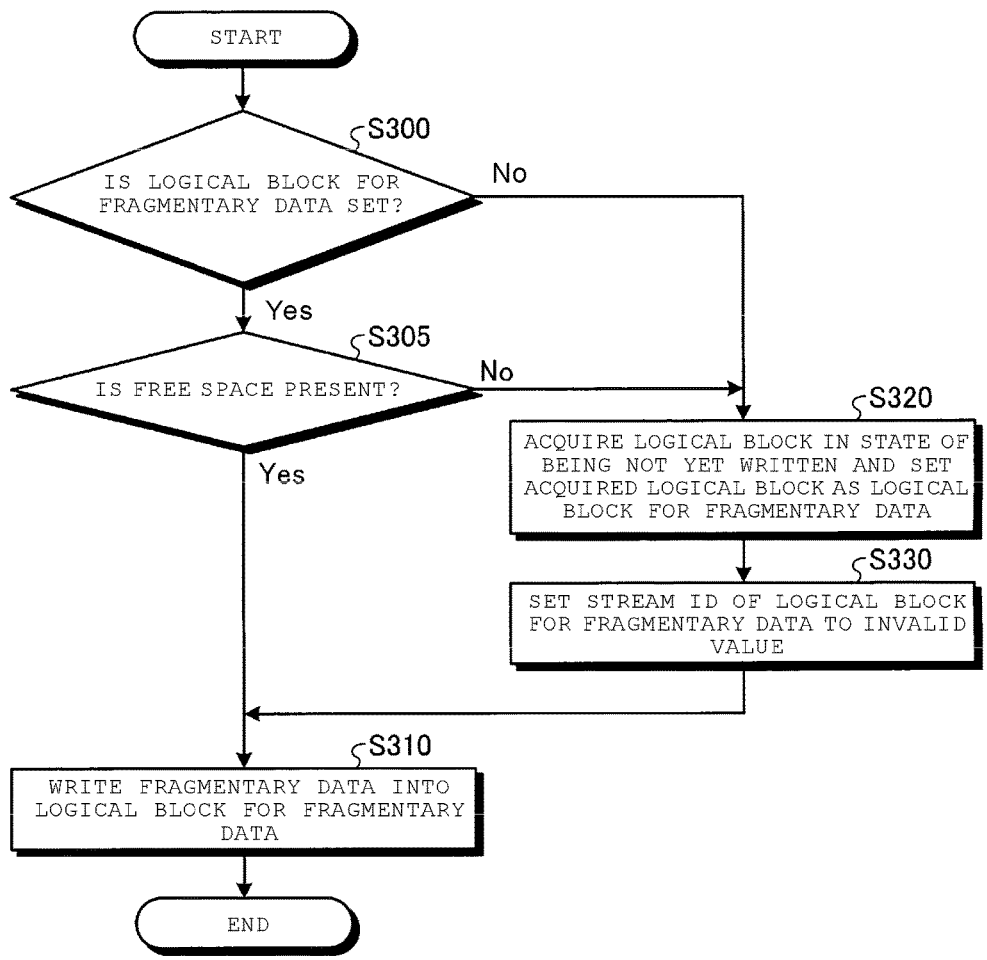
FIG. 6 is a flowchart illustrating an operation procedure for writing fragmentary data.

FIG. 6 is a flowchart illustrating an example of a detailed procedure of fragmentary data write processing. The GC write unit 36 determines whether or not the logical block for writing fragmentary data is set. The logical block for fragmentary data is a logical block shared by a plurality of different stream IDs. In a case where the logical block for fragmentary data is set (Yes in S300), the GC write unit 36 determines whether free space used for writing fragmentary data is present in the logical block for fragmentary data or not (S305). In a case where the free space is present (Yes in S305), the GC write unit 36 writes fragmentary data into the logical block for fragmentary data write (S310). On the other hand, in a case where the determination result in S300 is No or the determination result in 5305 is No, the GC write unit 36 acquires, for example, the erased block and sets the erased block, which is acquired, as the logical block for fragmentary data write (S320). Thereafter, the logical block for fragmentary data filled with pieces of fragmentary data is managed as a logical block having the stream ID of the invalid value in stream management information 44. Accordingly, the GC write unit 36 sets the stream ID of the logical block for fragmentary data to the invalid value (S330). The GC write unit 36 writes fragmentary data into a newly set logical block for fragmentary data (S310). When fragmentary data write processing is ended, there is no remaining valid data in the logical block of the garbage collection source. The GC write unit 36 updates the stream management information 44 so that association of the block ID of the logical block of the garbage collection source with the target stream ID is invalidated (S298). With this, the active block is released and transitions to a free block. Thereafter, processing proceeds to S100 of FIG. 4.

After S295 of FIG. 5 is executed, the GC write unit 36 requests a new logical block of garbage collection source belonging to the target stream ID to the GC source supply unit 34. The GC source supply unit 34, based on stream management information 44, determines whether the logical block belonging to the target stream ID is present or not (S180). In a case where the logical block which belongs to the target stream. ID is present (Yes in S180), the GC source supply unit 34 selects an active block having the lowest valid data ratio from among a plurality of logical blocks that belong to the target stream ID, based on stream management information 44 and block management information 46. The GC source supply unit 34 notifies the GC write unit 36 of a block address of the selected active block as a new garbage collection source (S190). Thereafter, garbage collection write processing described above is executed (S160).

In a case where the determination result in S250 of FIG. 5 is Yes and processing of S280 and S290 is executed, the GC write unit 36 ends garbage collection in which the logical block of the current target stream ID is used. Next, the GC write unit 36 confirms whether the number of free blocks greater than or equal to the threshold value C1 is obtained, with respect to the data management unit 31 (S100). In a case where the number of free blocks is less than the threshold value C1 (Yes in S100), the GC write unit 36 requests the GC source supply unit 34 to select a new target stream ID. The GC source supply unit 34 selects an active block having the lowest valid data ratio from among all active blocks to be subjected to multi-stream management, based on stream management information 44 and the block management information 46 (S110). While the active block is selected as such, only the valid data ratio is a determination criterion, an active block belonging to the stream ID which became a target to be subjected to garbage collection in a previous cycle could be selected, and also an active block belonging to the stream ID which did not become a target to be subjected to garbage collection in the previous cycle could be selected. Thereafter, garbage collection using a logical block having a next stream ID is started. That is, as described above, the count value of the write completion counter 45 is reset (S120), a single new erased block is allocated as the garbage collection destination (S130), the stream ID to which the active block selected in S110 belongs is set as a new target stream ID (S140), and the block ID of the erased block is associated with the set new target stream ID.

In a case where the logical block belonging to the target stream ID is not present (No in S180), the GC write unit 36 ends garbage collection in which the logical block of the current target stream ID is used. Thereafter, the procedure proceeds to S100 and in a case where the determination result in S100 is Yes, the procedure is executed again from S110. In a stage where control as described above is repeated and the number of free blocks, which amounts to the threshold value C1 of free blocks, is allocated (No in S100), garbage collection is ended.

Figure 7:
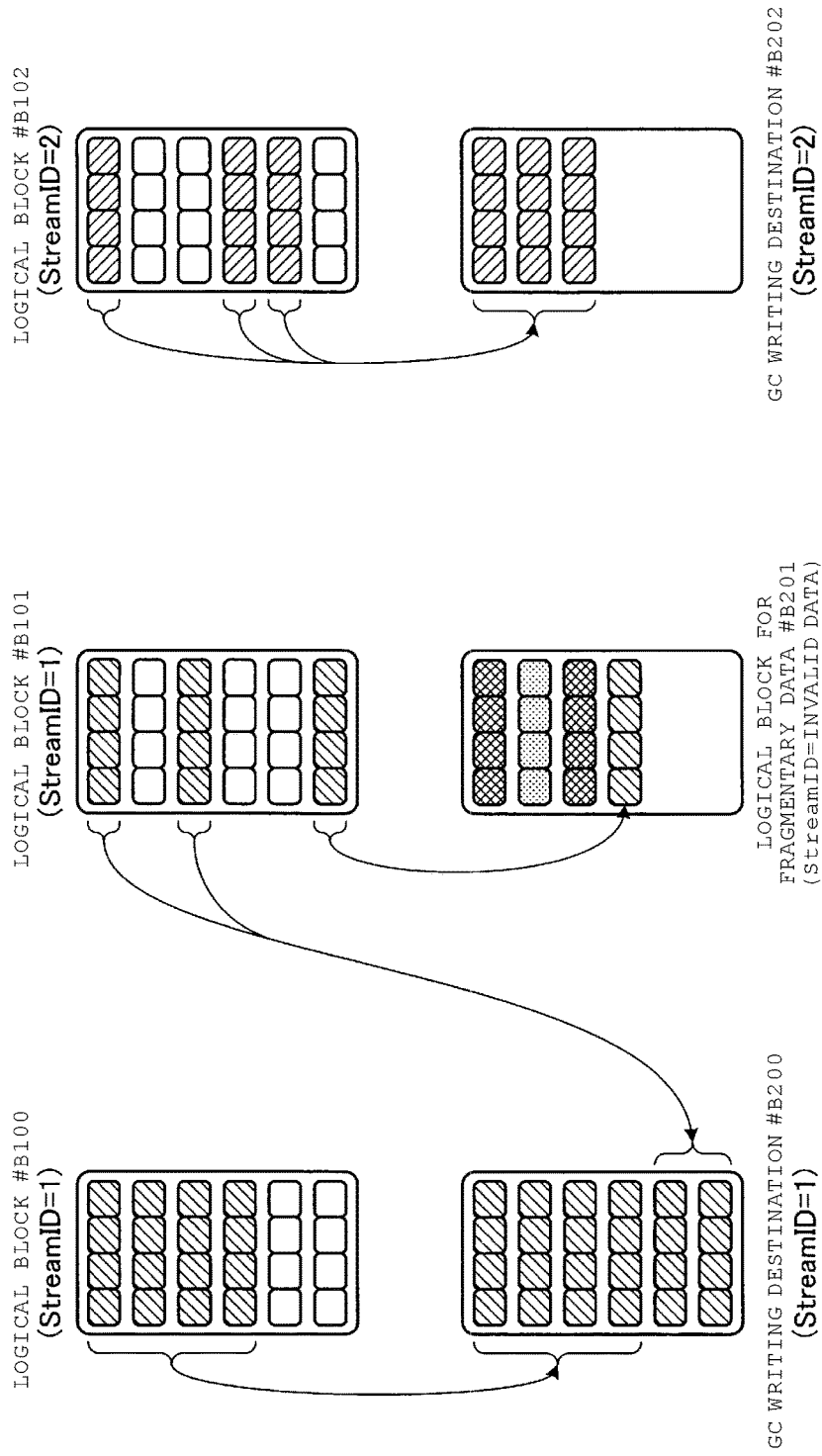
FIG. 7 is a diagram conceptually illustrating operations of garbage collection of the first embodiment.

FIG. 7 is a diagram conceptually illustrating the operation procedure of garbage collection of the first embodiment. At an upper side of FIG. 7, logical blocks #B100, #B101, and #B102 which are the logical blocks of the garbage collection source are illustrated. The logical blocks #B100 and #B101 belong to a stream having a stream ID=1 and the logical block #B102 belongs to a stream having a stream ID=2. At a lower side of FIG. 7, logical blocks #B200, #B201, and #B202 which are the logical blocks of the garbage collection destination are illustrated. Quadrangles illustrated by hatching with forward slashes, hatching with backward slashes, cross-hatching, or being filled with a plurality of dots correspond to physical clusters in which pieces of valid data are stored. Small blank quadrangles correspond to physical clusters in which pieces of invalid data are stored. The cluster is the minimum management unit for mapping of L2P information 41.

In FIG. 7, valid data stored in the logical block #B100 belonging to the stream ID=1 is read and is written into the logical block #B200. After this, since the logical block #B100 does not include valid data, association of the stream ID=1 with the logical block #B100 in the stream management information 44 is disassociated. Thereafter, the logical block #B100 is managed as a free block and the number of free blocks is incremented by one. A portion of pieces of valid data stored in the logical block #B101 which belongs to the stream ID=1 is read and is written into the logical block #B200. The logical block #B200 is filled with pieces of valid data by writing of valid data into logical block #B200 described above and thus, the write completion counter 45 is incremented. The stream ID=1 is associated with the logical block #B200 in stream management information 44.

Valid data remains in the logical block #B101. An amount of remaining valid data is smaller than the threshold value C3. Accordingly, valid data remaining in the logical block #B101 is read and is written into the logical block #B201. After this, the logical block #B101 does not include valid data and thus, association of the stream ID=1 with the logical block #B101 in the stream management information 44 is disassociated. Thereafter, the logical block #B101 is managed as a free block and the number of free blocks is incremented by one. The logical block #B201 is a logical block for fragmentary data. Small quadrangles illustrated by cross-hatching and small quadrangles illustrated by the plurality of dots indicate pieces of fragmentary data belonging to a stream different from the stream ID=1. As illustrated in FIG. 3, in stream management information 44, the logical block #B201 is associated with the stream ID of the invalid value.

Valid data stored in the logical block #B102 belonging to the stream ID=2 is read and is written into the logical block #B202. After this, since the logical block #B102 does not include valid data, association of the stream ID=2 with the logical block #B102 in the stream management information 44 is disassociated. Thereafter, the logical block #B102 is managed as a free block and the number of free blocks is incremented by one. The stream ID=2 is associated with the logical block #B202 in the stream management information 44.

Second Embodiment

Figure 8:
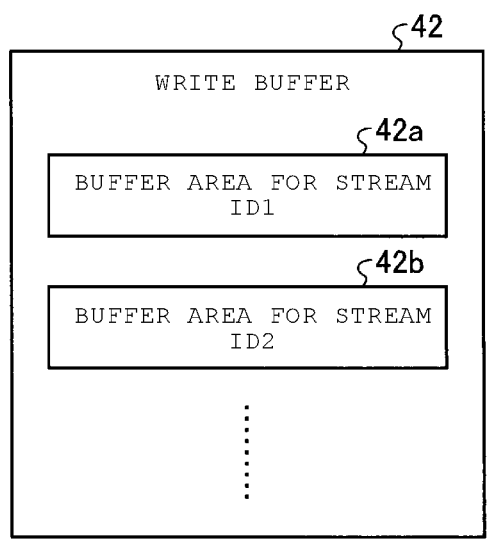
FIG. 8 is a block diagram illustrating an example of a configuration of a write buffer of a second embodiment.
Figure 9:
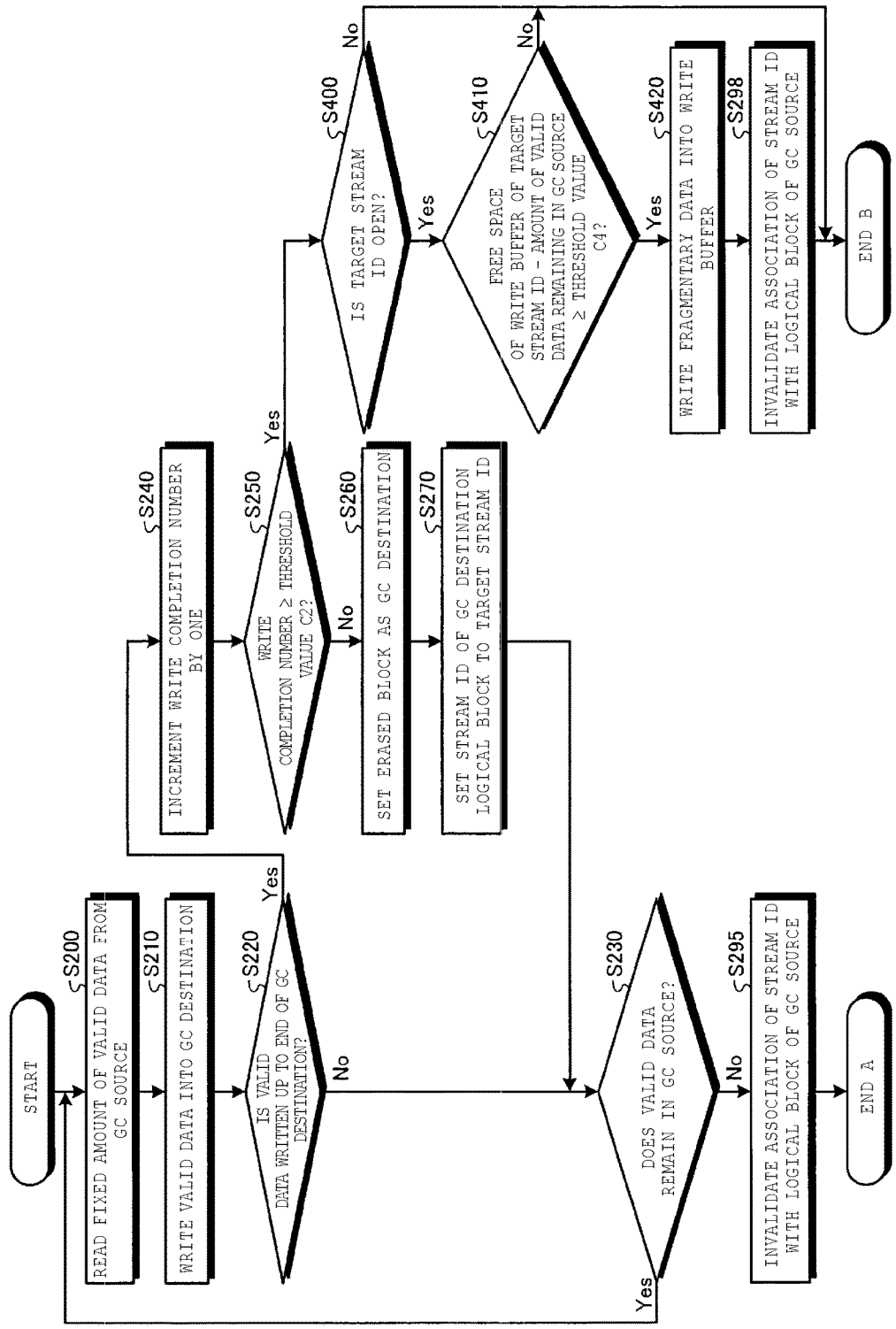
FIG. 9 is a flowchart illustrating an operation procedure of garbage collection of the second embodiment.

In a second embodiment, fragmentary data is written into the write buffer 42. FIG. 8 is a diagram illustrating an example of an internal configuration of the write buffer 42 applied to the second embodiment. In the second embodiment, the write buffer 42 is divided into a plurality of buffer areas by stream IDs. That is, the write buffer 42 includes a buffer area 42a for a stream ID1 and a buffer area 42b for a stream ID2, and the like. Functions of other constitutional elements of a memory system of the second embodiment are the same as those of the memory system 100 illustrated in FIG. 1 and thus, redundant description thereof will be omitted. Also, in the second embodiment, when garbage collection occurs for the logical block to be subjected to multi-stream management, the control circuit 30 operates according to the operation procedure illustrated in FIG. 4. FIG. 9 is a flowchart illustrating a detailed procedure of the second embodiment for garbage collection write processing of S160 of FIG. 4. Processing contents of S200, S210, S220, S230, S240, S250, S260, S270, and S295 of FIG. 9 are the same as those of S200, S210, S220, S230, S240, S250, S260, S270, and S295 of FIG. 5 and thus, redundant description thereof will be omitted.

In a case where the count value of the write completion counter 45 reaches the target value C2 of the write completion number in S250 (Yes in S250), the GC write unit 36 determines whether the current target stream ID is open or not (S400). In a case where the current target stream ID is not open but is closed (No in S400), the GC write unit 36 leaves valid data remaining in the logical block of the garbage collection source as it is and sets valid data as a target for next garbage collection. When closing a stream ID, the data management unit 31 writes data buffered in a buffer area for a stream ID to be closed into a logical block of a corresponding stream ID, makes the buffer area a free area, and then, closes the stream ID. In a case where the current target stream ID is open (Yes in S400), the GC write unit 36 subtracts the amount of valid data remaining in the logical block of the garbage collection source from the free space of the write buffer 42 of the current target stream ID. The GC write unit 36 compares the subtraction result with a threshold value C4 and determines whether the subtraction result is greater than or equal to the threshold value C4 or not (S410). In a case where it is determined that the subtraction result is greater than or equal to the threshold value C4 (Yes in S410), the GC write unit 36 determines that valid data remaining in the logical block of the garbage collection source is fragmentary data and buffers valid data remaining in the logical block of the garbage collection source in the write buffer 42 of the current target stream ID (S420). The threshold value C4 is set to have an allowance enough to allow write data, which is sent from the host 1, to be buffered in the write buffer 42 to some degree, even when fragmentary data is buffered in the write buffer 42 of the current target stream ID. When processing for buffering fragmentary data into the write buffer 42 is ended, there is no remaining valid data in the logical block of the garbage collection source. The GC write unit 36 updates the stream management information 44 so that association of the block ID of the logical block of the garbage collection source with the target stream ID is invalidated (S298). With this, the active block is released and transitions to a free block. Thereafter, processing proceeds to S100 of FIG. 4. In a case where it is determined that the subtraction result is less than the threshold value C4 (No in S410), the GC write unit 36 determines that valid data remaining in the logical block of the garbage collection source is not fragmentary data and leaves valid data remaining in the logical block of the garbage collection source as it is and sets valid data as a target for next garbage collection. Thereafter, processing proceeds to S100 of FIG. 4.

Figure 10:
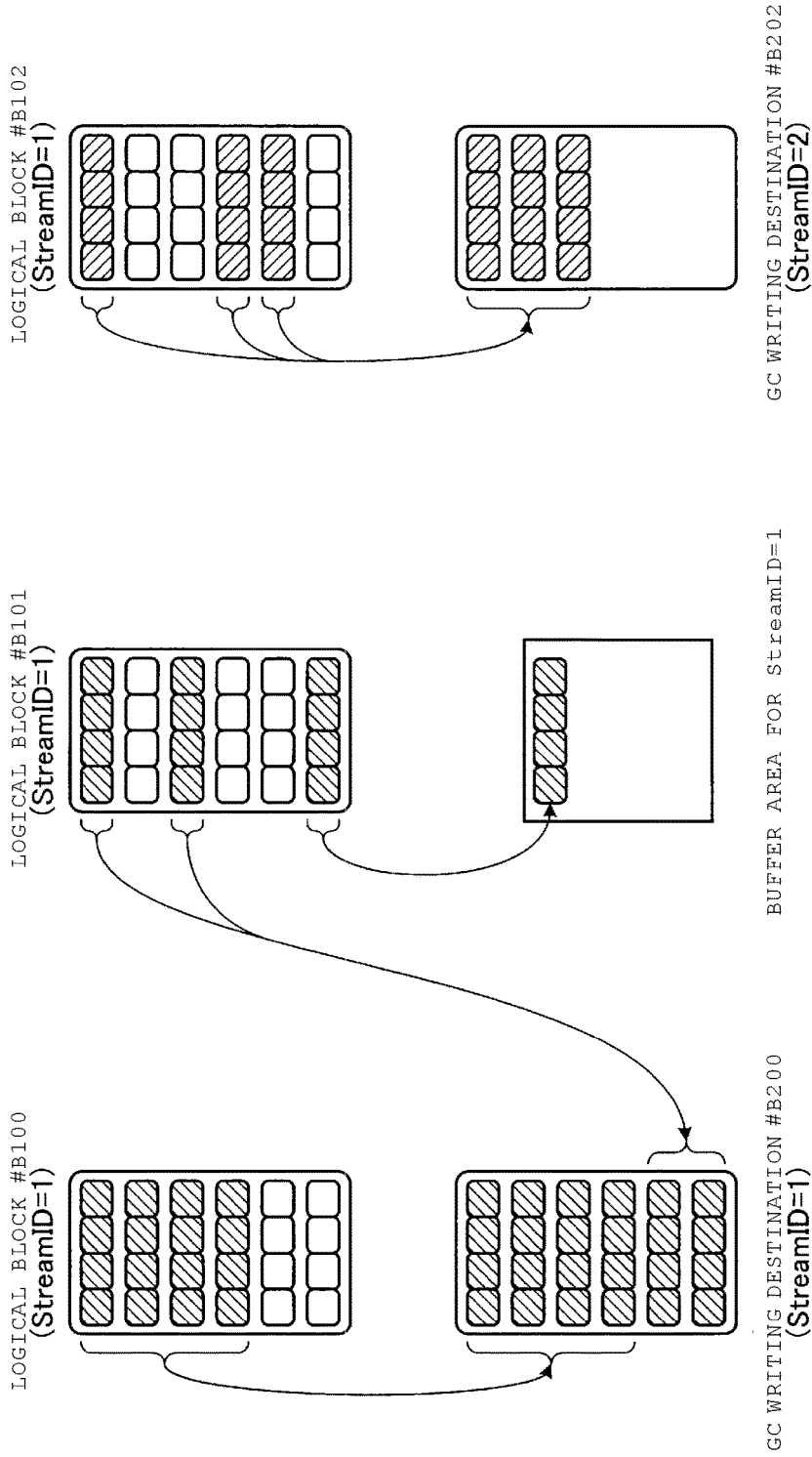
FIG. 10 is a diagram conceptually illustrating operations of garbage collection of the second embodiment.

FIG. 10 is a diagram conceptually illustrating an operation procedure of garbage collection of the second embodiment. At an upper side of FIG. 10, the logical blocks #B100, #B101, and #B102 which are the logical blocks of the garbage collection source are illustrated. At a lower side of FIG. 10, logical blocks #B200 and #B202 which are the logical blocks of the garbage collection destination and a portion of an area of the write buffer 42 which is a writing destination of fragmentary data are illustrated.

In FIG. 10, valid data stored in the logical block #B100 belonging to the stream ID=1 is read and is written into the logical block #B200. A portion of pieces of valid data stored in the logical block #B101 which belongs to the stream ID=1 is read and is written into the logical block #B200. In the stream management information 44, the logical block #B200 is associated with the stream ID=1.

Valid data remains in the logical block #B101. A value obtained by subtracting the amount of valid data remaining in the logical block #B101 from a free space of the buffer area for the stream ID=1 is greater than or equal to the threshold value C4. Accordingly, valid data remaining in the logical block #B101 is read and is buffered into the buffer area for the stream ID=1. Valid data stored in the logical block #B102 belonging to the stream. ID=2 is read and is written into the logical block #B202. The logical block #B202 is associated with the stream ID=2 in the stream management information 44.

Figure 11:
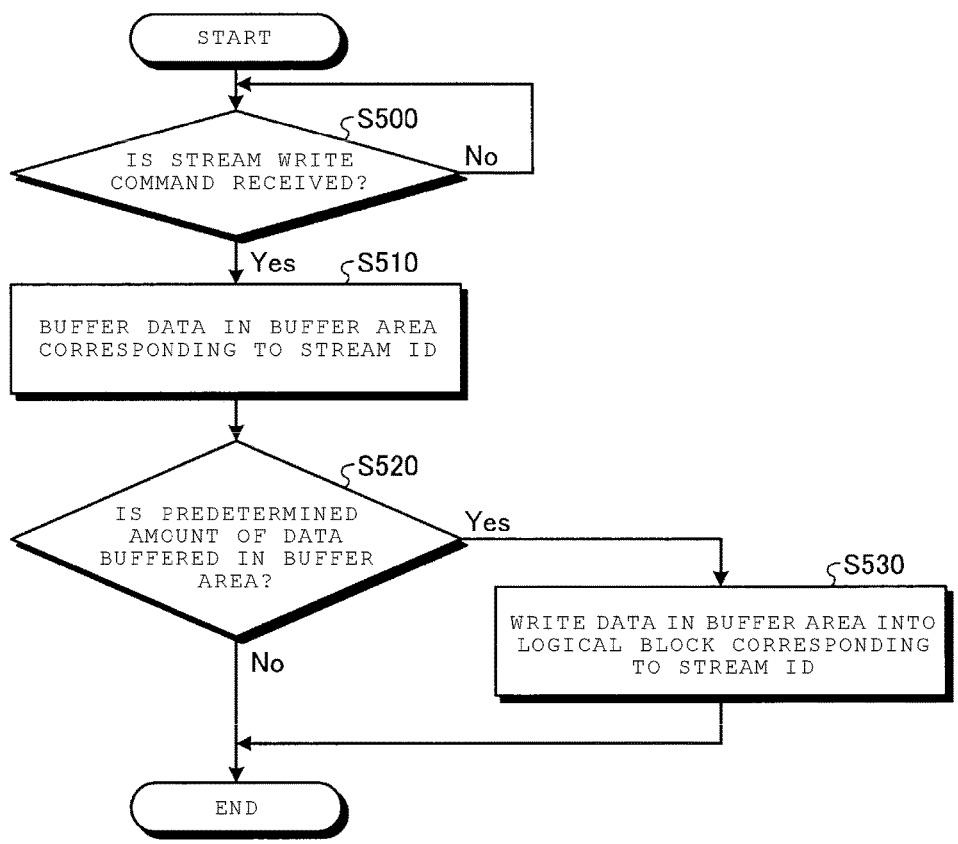
FIG. 11 is a flowchart illustrating an operation procedure of the memory system when a multi-stream write request is received from a host.

FIG. 11 is a flowchart illustrating an operation procedure of the control circuit 30 when a multi-stream write command is received. When a multi-stream write command is received (Yes in S500), the write control unit 32 buffers data transferred from the host 1 in a buffer area corresponding to the stream ID designated in the write command, among a plurality of buffer areas included in the write buffer 42 (S510). As described above, while the garbage collection process is performed, fragmentary data is likely to be buffered in respective buffer areas 42a and 42b of stream IDs.

In a case where an amount of data buffered in respective buffer areas 42a and 42b exceeds a predetermined amount (Yes in S520), the write control unit 32 flushes buffered data from the buffer area to the NAND memory 10. That is, the write control unit 32 acquires the logical block ID associated with the stream ID to which write data belongs based on stream management information 44 and writes data, which is present within the buffer area, into the logical block corresponding to the acquired logical block ID (S530). With this, fragmentary data buffered in the write buffer 42 is written into the logical block associated with a corresponding stream ID, together with write data in multi-stream from the host 1.

According to the second embodiment described above, fragmentary data is buffered in a write buffer for exclusive use of each stream and is written into the block associated with the corresponding stream ID, together with write data received from the host 1 after being buffered. For that reason, in addition to the effect of the first embodiment, an effect that processing time while garbage collection is performed can be reduced is obtained.

In the operation procedure illustrated in FIG. 4, in S180, it is determined whether the logical block belonging to the current target stream ID is present or not based on stream management information 44, in a case where it is determined that the logical block belonging to the current target stream ID is not present, garbage collection in which the logical block of the current target stream ID is used is ended, and garbage collection in which a logical block of a next stream ID is used is performed. However, the determination criterion of S180 may be changed as follows. That is, in a modification example, in a case where logical blocks, each belonging to the current target stream ID and having a valid data ratio less than a threshold value C5 and of which the number Na is greater than or equal to a threshold value C6, are present, the operation procedure is caused to proceed to S190 and in a case where the number Na of logical blocks is less than the threshold value C6, the procedure is caused to proceed to S100. The threshold value C5 maybe made to coincide with the threshold value C3 used in S280 of FIG. 5. In the modified example, garbage collection, in which only the logical block of which the valid data ratio is smaller the threshold value C5 is used as the garbage collection source, is performed and garbage collection in which a logical block of which the valid data ratio is large is not performed.

In the first embodiment, fragmentary data may be controlled to be left in the block of the garbage collection source as it is without being allowed to be written into the logical block used for writing of fragmentary data. In the second embodiment, fragmentary data may be controlled to be left in the block of the garbage collection source without being allowed to be written into the write buffer 42.

In the embodiments described above, writing of data or garbage collection is performed in units of logical pages. Alternatively, writing of data or garbage collection may be controlled to be performed in units of physical pages.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory that includes a plurality of blocks; and
a memory controller that includes a control circuit, wherein the control circuit operates so as to
execute a first garbage collection for a first stream, which includes reading valid first data stored in a first block associated with the first stream and valid second data stored in a second block associated with the first stream from the nonvolatile memory and writing the read first data and the read second data into one or more third blocks of the nonvolatile memory that are associated with the first stream, and
execute a second garbage collection for a second stream, which includes reading valid third data stored in a fourth block associated with the second stream and valid fourth data stored in a fifth block associated with the second stream from the nonvolatile memory and writing the read third data and the read fourth data into one or more sixth blocks of the nonvolatile memory that are associated with the second stream.

2. The memory system according to claim 1, wherein the control circuit, in executing the first garbage collection, selects the first block and the second block from a plurality of blocks associated with the first stream based on a valid data ratio or an amount of valid data within the blocks and, in executing the second garbage collection, selects the fourth block and the fifth block from a plurality of blocks associated with the second stream based on a valid data ratio or an amount of valid data within the blocks.

3. The memory system according to claim 1, wherein the control circuit ends the first garbage collection in a case when the number of the third blocks into which the first data and the second data are written reaches a first threshold value, and
the control circuit ends the second garbage collection in a case when the number of the sixth blocks into which the third data and the fourth data are written reaches a second threshold value.

4. The memory system according to claim 1, wherein the control circuit ends the first garbage collection if the number of blocks associated with the first stream, each of which has an amount of valid data or a valid data ratio less than a first threshold value, is less than a second threshold value, and
the control circuit ends the second garbage collection if the number of blocks associated with the second stream, each of which has an amount of valid data or a valid data ratio less than the first threshold value, is less than the second threshold value.

5. The memory system according to claim 1, wherein in a case where the number of the third blocks into which the first data and the second data are written reaches a first threshold value and an amount of valid data remaining in the first block is smaller than a second threshold value, the control circuit writes the remaining valid data in the first block into a seventh block shared by the first stream and the second stream.

6. The memory system according to claim 5, wherein the control circuit associates a stream ID having an invalid value with the seventh block.

7. The memory system according to claim 1, wherein in a case where the number of the third blocks into which the first data and the second data are written reaches a first threshold value and an amount of valid data remaining in the first block is larger than a second threshold value, the control circuit ends the first garbage collection such that the remaining valid data in the first block is allowed to remain in the first block.

8. The memory system according to claim 1, further comprising:
a write buffer that buffers data associated with the first stream and received from a host, wherein, in a case where the number of the third blocks into which the first data and the second data are written reaches a first threshold value and a difference between free space of the write buffer and an amount of valid data remaining in the first block is larger than a second threshold value, the control circuit buffers the remaining valid data in the first block into the write buffer.

9. The memory system according to claim 8,
wherein, when data associated with the first stream is received from the host, the control circuit buffers the received data into the write buffer, and
when an amount of data buffered in the write buffer exceeds a third threshold value, the control circuit writes the data buffered in the write buffer into a seventh block associated with the first stream.

10. The memory system according to claim 8,
wherein, in a case where the number of the third blocks into which the first data and the second data are written reaches the first threshold value and the difference is smaller than the second threshold value, the control circuit ends the first garbage collection such that the remaining valid data is allowed to remain in the first block.

11. A method of performing garbage collection in a nonvolatile memory including a plurality of blocks, the method comprising:
executing a first garbage collection for a first stream, which includes reading valid first data stored in a first block associated with the first stream and valid second data stored in a second block associated with the first stream from the nonvolatile memory and writing the read first data and the read second data into one or more third blocks of the nonvolatile memory that are associated with the first stream; and
executing a second garbage collection for a second stream, which includes reading valid third data stored in a fourth block associated with the second stream and valid fourth data stored in a fifth block associated with the second stream from the nonvolatile memory and writing the read third data and the read fourth data into one or more sixth blocks of the nonvolatile memory that are associated with the second stream.

12. The method according to claim 11, further comprising:
in executing the first garbage collection, selecting the first block and the second block from a plurality of blocks associated with the first stream based on a valid data ratio or an amount of valid data within the blocks; and
in executing the second garbage collection, selecting the fourth block and the fifth block from a plurality of blocks associated with the second stream, based on a valid data ratio or an amount of valid data within the blocks.

13. The method according to claim 11, further comprising:
ending the first garbage collection in a case when the number of the third blocks into which the first data and the second data are written reaches a first threshold value, and
ending the second garbage collection in a case when the number of the sixth blocks into which the third data and the fourth data are written reaches a second threshold value.

14. The method according to claim 11, further comprising:
ending the first garbage collection if the number of blocks, each of which has an amount of valid data or a valid data ratio less than a first threshold value, is less than a second threshold value, and
ending the second garbage collection according to matters that the number of blocks, each of which has an amount of valid data or a valid data ratio less than the first threshold value, is less than the second threshold value.

15. The method according to claim 11, further comprising:
in a case where the number of the third blocks into which the first data and the second data are written reaches a first threshold value and an amount of valid data remaining in the first block is smaller than a second threshold value, writing the remaining valid data in the first block into a seventh block shared by the first stream and the second stream.

16. The method according to claim 15,
wherein the seventh block is associated with a stream ID having an invalid value.

17. The method according to claim 11, further comprising:
in a case where the number of the third blocks into which the first data and the second data are written reaches a first threshold value and an amount of valid data remaining in the first block is larger than a fourth threshold value, ending the first garbage collection such that the remaining valid data in the first block is allowed to remain in the first block.

18. The method according to claim 11, wherein the nonvolatile memory includes a write buffer associated with the first stream, and the method further comprises:
buffering the remaining valid data in the first block into the write buffer, in a case where the number of the third blocks into which the first data are written reaches a first threshold value and a difference between free space of the write buffer and an amount of valid data remaining in the first block is larger than a second threshold value.

19. The method according to claim 18, further comprising:
when data associated with the first stream is received from a host, buffering the received data into the write buffer, and
when an amount of data buffered in the write buffer exceeds a third threshold value, writing the data buffered in the write buffer into a seventh block associated with the first stream.

20. The method according to claim 18, further comprising:
in a case where the number of the third blocks into which the first data and the second data are written reaches the first threshold value and the difference is smaller than the second threshold value, ending the first garbage collection such that the remaining valid data is allowed to remain in the first block.

\* \* \* \* \*